United States Patent
Kim et al.

(10) Patent No.: US 8,558,966 B2
(45) Date of Patent: Oct. 15, 2013

(54) LIQUID CRYSTAL DISPLAY DEVICE INCLUDING BACK LIGHT HAVING IMPROVED LIGHT CONCENTRATION EFFICIENCY

(75) Inventors: Byoung-Ku Kim, Gyeongsangbuk-Do (KR); Jae-hyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 240 days.

(21) Appl. No.: 12/318,161

(22) Filed: Dec. 22, 2008

(65) Prior Publication Data

US 2009/0322988 A1 Dec. 31, 2009

(30) Foreign Application Priority Data

Jun. 26, 2008 (KR) .................. 10-2008-0061097
Jul. 3, 2008 (KR) .................. 10-2008-0064242

(51) Int. Cl.
*G02F 1/1335* (2006.01)
*F21V 7/04* (2006.01)

(52) U.S. Cl.
USPC ................. 349/62; 349/65; 362/620

(58) Field of Classification Search
USPC ........................ 349/62, 65; 362/620
See application file for complete search history.

(56) References Cited

U.S. PATENT DOCUMENTS

2005/0140846 A1* 6/2005 Lubart et al. .................. 349/62
2005/0275767 A1* 12/2005 Huang et al. .................. 349/64
2008/0303975 A1* 12/2008 Mizuno et al. ................ 349/62

FOREIGN PATENT DOCUMENTS

CN 1396483 A 2/2003
JP 61032034 A * 2/1986

OTHER PUBLICATIONS

Chinese Patent Application No. 200810184678.4, Office Action dated Dec. 7, 2011 and English translation thereof.

* cited by examiner

*Primary Examiner* — Nathanael R Briggs
(74) *Attorney, Agent, or Firm* — Morgan, Lewis & Bockius LLP

(57) ABSTRACT

A liquid crystal display device capable of preventing a split between a light guide plate and a prism sheet disposed at an upper side thereof and improving concentration efficiency, the device including a liquid crystal panel configured to represent an image, a lamp disposed below the liquid crystal panel to provide light to the liquid crystal panel, a light guide plate having the lamp disposed at least at one side thereof, and a birefringence optical sheet disposed between the liquid crystal panel and the light guide plate, and having a first prism pattern with a first refractive index, the pattern facing the liquid crystal panel, and a second prism pattern with a second refractive index higher than the first refractive index, the pattern facing the light guide plate.

20 Claims, 8 Drawing Sheets

LIQUID CRYSTAL DISPLAY DEVICE INCLUDING BACK LIGHT HAVING IMPROVED LIGHT CONCENTRATION EFFICIENCY

The present disclosure relates to subject matter contained in priority Korean Application No. 10-2008-0061097, filed on Jun. 26, 2008 and 10-2008-0064242, filed on Jul. 3, 2008, which are both herein expressly incorporated by reference in their entirety.

BACKGROUND OF THE INVENTION

1. Field of the Invention

The present invention relates to a liquid crystal display (LCD) device, and particularly, to a LCD device capable of preventing a split between a light guide plate and a prism sheet disposed on the light guide plate and enhancing a concentration efficiency, by employing a birefringence optical sheet provided with first prism mountains having a low refractive index and second prism mountains formed between the first prism mountains and having a higher refractive index than that of the first prism mountains.

2. Background of the Invention

In general, a liquid crystal display (LCD) device is a representative flat display device for displaying an image by controlling light transmittance in correspondence with an image signal. However, the LCD device cannot emit light by itself. Thus, in order to visually display an image, a separate light source for emitting light from a rear surface of a liquid crystal module is required.

As such, to irradiate light from a rear surface of a liquid crystal module (LCM) onto a liquid crystal panel disposed at a front surface thereof, a light source (i.e., a lamp), a power source circuit for driving the light source and every component required for implementing uniform plane light are referred to as 'backlight unit'. Such backlight units may be classified into two types, according to a method of irradiating light, namely, a direct type backlight unit ad an edge type backlight unit. Various researches have currently been conducted for direct type and edge type backlight units employing a surface light source, such as a light emitting diode (LED) or the like.

First, an edge type backlight unit is configured such that a light source is located at a side surface of a LCD module and light coming from the light source becomes plane light via a light guide plate. Such edge type backlight unit has a disadvantage, such as a difficulty in avoiding a degradation of an overall brightness. Hence, in order to obtain uniform brightness, it requires a more efficient light inducing system, namely, a system for inducing light up to a relatively remote distance from a light source. Also, an enhanced optical technology has been required to minimize light loss during transferring light up to a relatively remote distance from a light source.

FIG. 1 is a perspective view of a backlight unit according to the related art, FIG. 2a is a plot chart showing the emission distribution of light transmitted through a prism light guide plate and the emission distribution of light transmitted through a diffuser sheet, and FIG. 2b is a contour chart showing the emission distribution of light transmitted through a prism light guide plate.

As shown in FIG. 1, a backlight unit according to the related art includes a cold cathode fluorescent lamp 25 and a lamp housing 26 disposed at one side thereof, and a prism light guide plate 20 having one side surface mounted adjacent to the cold cathode fluorescent lamp 25. Also, a reflective plate 21 is disposed below the prism light guide plate 20, and a reverse prism sheet 22 and a protection sheet 23 are sequentially stacked on the prism light guide plate 20. Functions of the prism light guide plate 20 and various sheets will now be described.

One side surface of the prism light guide plate 20 is provided adjacent to the cold cathode fluorescent lamp 25, thus to emit light incident from the cold cathode fluorescent lamp 25 to its upper surface. The prism light guide plate 20 is configured such that it can be thinner as being apart from the cold cathode fluorescent lamp 25, in order to allow light incident from its side surface, at which the cold cathode fluorescent lamp 25 is located, to be uniformly emitted to its upper surface.

The reflective plate 21 is disposed below the prism light guide plate 20, so as to prevent a light leakage through the lower surface of the prism light guide plate 20 and simultaneously to reflect light toward the upper surface of the prism light guide plate 20

Accordingly, emission light transmitted through the prism light guide plate 20 is mainly distributed between 40° and 80° (approximately, 76°) with respect to the bottom surface, as shown in FIGS. 2a and 2b, and an emission light having the highest brightness has an emission angle of about 80°. However, in the related art LCD device, upon applying an external impact thereto, such as an impact test or the like, a friction between a prism pattern formed at a lower surface of the prism light guide plate 20 and the reflective plate 21, more precisely, an impact between the prism pattern and a lower cover (not shown) attached on the reflective plate 21 occurs. Accordingly, the prism pattern of the prism light guide plate 20 is split or such pattern is collapsed. Alternatively, a friction occurs between the prism light guide plate 20 formed of a rigid material and a prism pattern of the reverse prism sheet 22 formed of a ductile material, thereby causing a split or collapse of the prism pattern of the reverse prism sheet 22. Accordingly, the related art LCD device has a problem, so-called a white spot phenomenon that a certain region is brighter or darker than its surroundings.

Although not shown in detail in Figures, a typical prism sheet (not shown) may be provided at an upper surface of the prism light guide plate 20 to have prism mountains protruding toward a liquid crystal panel. Even in this case, as shown in FIG. 2c, to refract incident light at the prism sheet in a perpendicular direction, the first light L1, which is incident on a prism face by an angle of approximately 24° to 32° according to Snell's law, is required. However, for the prism light guide plate 20, most of light has an angle of 40°, the fourth light L4 which is not incident within 24° to 32° is refracted on the prism sheet to become the fifth light L5. The fifth light L5 is then departed from the prism sheet to proceed in a lateral direction, thereby to become the sixth light L6, which is called 'side lobe phenomenon', as shown in part A of FIG. 2c. Such phenomenon causes a drastic degradation of emission efficiency. Hence, a diffuser sheet (not shown) is further provided between the prism light guide plate 20 and the prism sheet in order to change the range of the main emission light of the prism light guide plate 20.

Upon employing the diffuser sheet for the above purpose, the main emission distribution of light through the prism light guide plate 20 is then changed from the range of 40° to 80° as shown in FIG. 2a to the range of 10° to 45°. Accordingly, the first light L1 having an angle of 24° to 32°, which is emitted via the prism light guide plate 20 and the diffuser sheet, becomes the second light L2 having an angle of 15° to 20° based upon a perpendicular line of the prism sheet within the prism sheet. The second light L2, which is departed from the prism sheet, contacts air to be perpendicularly refracted, thereby becoming the third light L3. Therefore, the perpendicular brightness of the prism sheet with respect to the upper surface of the prism light guide plate 20 increases. However, the emission light diverged from the range of 24° to 32°, emitted through the prism light guide plate 22, is still subjected to the side lobe phenomenon as shown in part A of FIG. 2c. That is, without using the main emission light of the prism light guide plate 20, the low concentration efficiency is still problematic.

SUMMARY OF THE INVENTION

Therefore, an object of embodiments of the invention is to prevent a split between a light guide plate and a prism sheet disposed on the light guide plate and to improve concentration efficiency.

To achieve these and other advantages and in accordance with the purpose of embodiments of the invention, as embodied and broadly described herein, there is provided a liquid crystal display device including, a liquid crystal panel configured to represent an image, a lamp disposed below the liquid crystal panel for supplying light to the liquid crystal panel, a light guide plate having the lamp at least at one side thereof, and a birefringence optical sheet disposed between the liquid crystal panel and the light guide plate, and the birefringence optical sheet having a first prism pattern with a first refractive index, the pattern facing the liquid crystal panel, and a second prism pattern with a second refractive index higher than the first refractive index, the pattern facing the light guide plate.

The light guide plate has prism pattern formed on an upper surface thereof in a direction facing the liquid crystal panel, wherein the prism pattern of the light guide plate is at least one of prism mountain, lenticular from and pyramid form. Or, the prism pattern of the light guide plate is at least one of intaglio or relievo.

The foregoing and other objects, features, aspects and advantages of the invention will become more apparent from the following detailed description of embodiments of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3b is a view showing how to concentrate light by a birefringence optical sheet of FIG. 3a;

DETAILED DESCRIPTION OF THE PREFERRED EMBODIMENTS

Description will now be given in detail of the configuration of embodiments the invention, with reference to the accompanying drawings.

Figure 1:
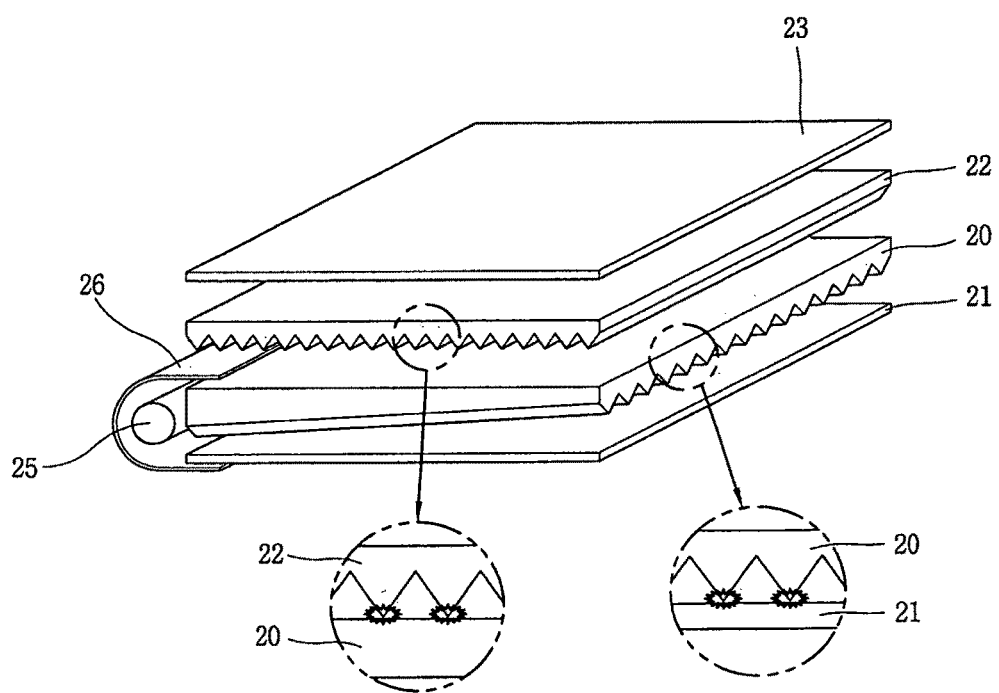
FIG. 1 is a perspective view of a backlight unit according to the related art.
Figure 2A:
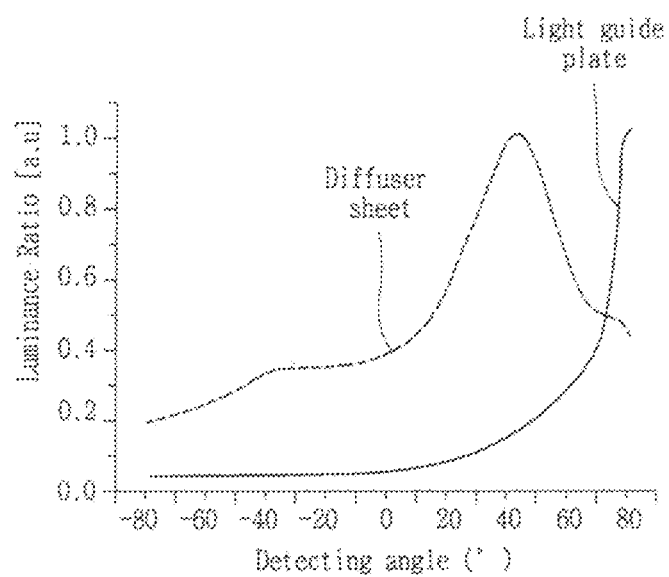
FIG. 2a is a plot chart showing the emission distribution of light transmitted through a prism light guide plate and the emission distribution of light transmitted through a diffuser sheet.
Figure 2B:
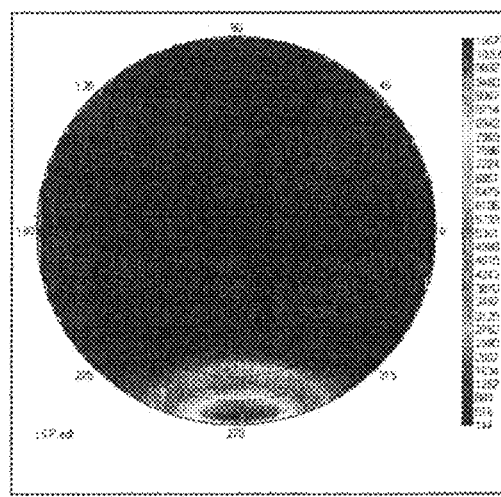
FIG. 2b is a contour chart showing the emission distribution of light transmitted through a prism light guide plate.
Figure 2C:
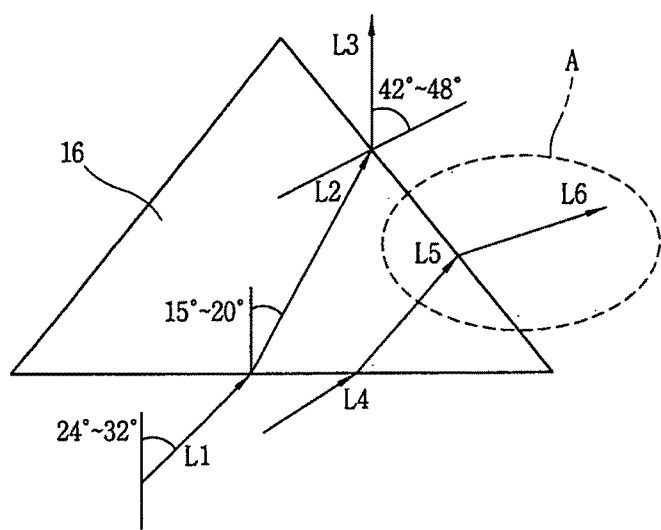
FIG. 2c is an enlarged cross-sectional view of one prism mountain of a prism sheet in case of employing the prism sheet having prism mountains facing a liquid crystal panel.
Figure 3A:
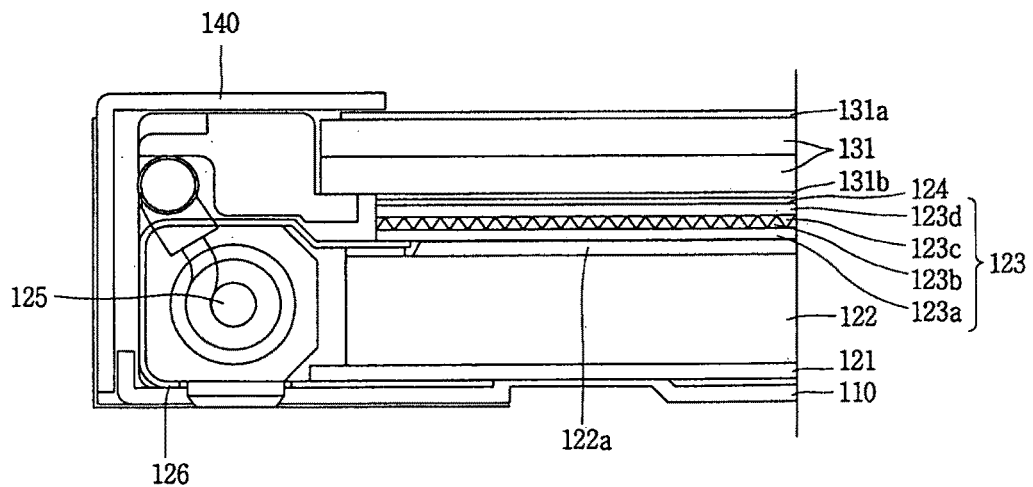
FIG. 3a is a cross-sectional view of a liquid crystal display device, which shows a liquid crystal display device having a plate type light guide plate according to an embodiments of the invention.

FIG. 3a is a cross-sectional view of a liquid crystal display device, which shows a liquid crystal display device having a plate type light guide plate according to embodiments of the invention. A liquid crystal display (LCD) device according to embodiments of the invention may include a liquid crystal panel 131 configured to represent an image according to an external signal, a backlight unit 121-126 arranged below the liquid crystal panel 131 so as to emit light, and a birefringence optical sheet 123 disposed between the liquid crystal panel 131 and the backlight unit and provided with first prism mountains 123b formed on a plate type prism light guide plate 122 to have patterns facing the liquid crystal panel and second prism mountains 123c each formed between the first prism mountains 123b, namely, along a ravine of the first prism mountains 123b, and having a refractive index higher than that of the first prism mountains 123b.

First, a reflective plate 121 formed of iron or electrolytic galvanized iron (EGI) is attached on a lower cover 110. The reflective plate 121 may be implemented using a white polyester film or a film coated with a metal (e.g., Ag, Al, etc.). The reflective plate 121 has approximately 90~97% of a reflectivity of visible rays, and such reflectivity is risen when using a thicker coated film.

Also, a lamp unit 125 and 126 is disposed at both sides of the lower cover 110 having the reflective plate 121 attached thereto. Here, the lamp unit 125 and 126 may include a lamp 125 for emitting light by receiving an external voltage and a lamp housing 126 for protecting the lamp 125 from an external impact. Here, the lamp 125 may be one of Cold Cathode Fluorescent Lamp (CCFL), External Electrode Fluorescent Lamp (EEFL) and Hot Cathode Fluorescence lamp (HCFL).

A prism light guide plate 122 disposed at one side of the lamp unit 125 and 126 is stacked on the reflective plate 121 disposed on the lower cover 110. Here, the prism light guide plate 122 is configured to have a uniform thickness. Although not substantially shown in detail in FIG. 3A, prism mountains 122a are formed on the prism light guide plate 122 in such a manner that the extending direction of the prism mountains 122a is perpendicular to the extending direction of the lamp 125 arranged in a major axial direction, so as to concentrate light.

Here, preferably, the prism mountains 122a of the prism light guide plate 122 is configured such that mountains configuring a ridge along an ongoing direction of light are formed on the prism light guide plate 122. Alternatively, they may be configured in a uniform arrangement of lenticular shapes or pyramid shapes or randomly be configured. Such prism patterns can be implemented in a concave-convex form, and also be arranged in a horizontal direction to the lamp 125 disposed in the major axial direction. However, the embodiments of the invention may not be limited to such configuration.

J As depicted above, the prism light guide plate 122 is made of a polymer material, such as polymethylmethacrylate (PMMA) or cyclic olefin polymer (COP). In order for light emitted from the lamp 125 located at the side surface thereof to be incident on a liquid crystal panel 131, the light from the lamp 125 is induced via the prism light guide plate 122 to be reflected on the reflective plate 121 located below the prism light guide plate 122. Here, such light is emitted in a direction that a main emission peak intensity is approximately 76° with respect to an upper side surface of the prism light guide plate 122.

Also, among other polymer materials, the prism light guide plate 122 provides the lowest absorbent with respect to light in a visible ray area, and accordingly provides very high transparency and high gloss. In addition, it is not broken or deformed due to its high mechanical intensity. The prism light guide plate 22 is also light in weight and has a strong chemical resistance. Furthermore, the prism light guide plate 122 provides 90~91% of such high visible ray transmittance and a low internal loss. The prism light guide plate 122 also has strong mechanical features such as tensile strength, flexural strength, extensional strength and the like.

Although not shown in detail in Figures, a plurality of etching patterns for blocking a light leakage may be configured at a lower surface of the prism light guide plate 122.

The LCD device according to a preferred embodiment of the invention has exemplarily been described to be provided with the prism light guide plate 122 having the prism mountains 122a formed on its upper surface; however, embodiments of the invention may not be limited thereto. Many variations, such as providing a typical type of light guide plate without having a prism mountain or the like, can be implemented without being apart from the concepts of the embodiments of the invention.

Referring to FIG. 3, the prism light guide plate 122 includes a birefringence optical sheet 123 thereon. The birefringence optical sheet 123 includes the first prism mountains 123b whose extending direction is orthogonal to the extending direction of the prism mountains 122a configured on the prism light guide plate 122 to configure upward patterns, and each of the second prism mountains 123c formed between two of the first prism mountains 123b to configure downward patterns.

Such birefringence optical sheet 123 makes light, which has been emitted via the prism light guide plate 122 by 76° with respect to the upper side surface of the prism light guide plate 122, emitted in a perpendicular direction with respect to the bottom surface of the prism light guide plate 122, thus to reach the liquid crystal panel 131.

For example, the birefringence optical sheet 123 according to the embodiments of the invention, as shown in FIG. 3a, includes first prism mountains 123b formed to be orthogonal to the extending direction of the prism mountains 122a of the prism light guide plate 122, which configures a base, the first prism mountains 123b having a low refractive index, and each of second prism mountains 123c formed by filling acryl resin (i.e., ultraviolet curable resin) with a high refractive index in a ravine between two of the first prism mountains 123b. It is preferable to form an upper base film 123d on the second prism mountains 123c. Accordingly, the upper and lower surfaces of the birefringence optical sheet 123 can be configured to be flat.

The two base films 123a and 123d and the first and second prism mountains 123b and 123c may basically be made respectively of polyethylene (PET) suitable for creating patterns and acryl resin which is an ultraviolet curable resin.

The two base films 123a and 123d may be formed of a synthetic resin, such as polyethylene terephthalate, polyethylene naphthalate, acrylic resin, polycarbonate, polystyrene, polyolefin, cellulose acetate, water-resistant vinyl chloride and the like. Preferably, the two base films 123a and 123d are transparent films because they should transmit emission light of the prism light guide plate 122.

The thickness of each of the two base films 123a and 123d is one of 100 μm, 125 μm, 188 μm and 250 μm. An ultraviolet curable resin for creating patterns is deposited on the lower base film 123a, and then the first prism mountains 123b are molded thereon to be hardened by using ultraviolet rays. Next, an ultraviolet curable resin is filled in a ravine between the first prism mountains 123b to create the second prism mountains 123c, which is then hardened. The upper base film 123d is laminated on the second prism mountains 123c.

As mentioned above, in embodiments of the invention, the lower and upper base films 123a and 123d are formed of a material which has a thermal expansion rate, corresponding to an average value of the thermal expansion rates of the first and second prism mountains 123b and 123c. The average thermal expansion rate may be calculated by considering volumes of the first and second prism mountains 123b and 123c, an interval between mountains, and the like. In order to prevent a deformation due to different thermal expansion rates, it is preferable that a first boundary between the lower base film 123a and the first prim mountains 123b is the same as a second boundary between the upper base film 123d and the second prism mountains 123c.

As one method for preventing the deformation of the lower and upper baser films 123a and 123d, they can be made of the same material to the average thermal expansion rate which is obtained by averaging the thermal expansion rates of the first and second prism mountains 123b and 123c. The lower and upper base films 123a and 123d can serve to support the first and second prism mountains 123b and 123c, thus to prevent wrinkles and flexion of them. In case where the lower and upper base films 123a and 123d are thicker than the first and second prism mountains 123b and 123c, the flexion due to the thermal expansion of the first and second prism mountains 123b and 123c can be prevented.

As depicted above, the birefringence optical sheet 123 is named because of being provided with the first prism mountains 123b having the low refractive index and the second prism mountains 123c having the refractive index higher than that of the first prism mountains 123b. If a reference for indicating a difference between low refractive index and high refractive index is 1.51, the high refractive index may be more than 1.51 whereas the low refractive index may be less than 1.51. Hence, an optical characteristic may depend on what reference is designated for the difference therebetween.

By adding different additive to acryl resin, the first prism mountains 123b are configured to have a first refractive index and the second prism mountains 123c are configured to have a second refractive index. Here, the first refractive index may be in the range of 1.3~1.9, and the second refractive index in the range of 1.4~2.0. Preferably, the first refractive index is in the range of 1.3~1.49, and the second refractive index is in the range of 1.5~1.7.

Here, the difference between the first and second refractive indexes is 0.1 or more, and preferably, in the range of 0.1~0.2.

Briefly explaining the characteristic of light which is refracted at a boundary face between the first and second prism mountains 123b and 123c, part of such light may be reflected and the rest of light may be refracted at the boundary face. Here, upon using Snell's law, a condition of n1·sin θ1=n2·sin θ2 should be met. Here, n1 denotes a low refractive index and n2 denotes a high refractive index. So, for satisfying such condition, θ2 should be smaller than θ1. Thus, in such a manner, light can be emitted to be perpendicular to the liquid crystal panel 131.

The optical characteristic corresponds to a specific characteristic of the very material having a low or high refractive index, which means such refractive index can be different depending on what kind of material is used and what kinds of materials are mixed together. Thus, the embodiments of the invention representatively illustrates an acryl-based UV curable resin. It is based upon an interior angle of each prism mountain being 54° or 58°, for example, as shown in the related art. However, in the embodiments of the invention, such optical characteristic can be changed according to how to design an interior angle of the first prism mountains 123b as well as such material having a low or high refractive index.

In addition, the birefringence optical sheet 123 of the embodiments of the invention may preferably be implemented, as similar to the prism light guide plate 122, such that mountains are arranged in a perpendicular direction to an ongoing direction of light to form a ridge. Alternatively, it may be formed of one of lenticular form, pyramid form, polygonal form, and the like in a constant arrangement, or randomly be formed. Such prism patterns may be configured in concave or convex forms, and also be arranged in a direction horizontal to the lamp 125 disposed in a major axial direction. Thus, the configuration may not be limited to the above manner.

A sub optical sheet 124 for complementing an optical characteristic of light transmitted through the birefringence optical sheet 123 is stacked on the birefringence optical sheet 123. Here, the sub optical sheet 124 may be, for example, a diff-user sheet having diffusion patterns for complementing non-uniformity of light, or be a protection sheet for protecting the birefringence optical sheet 123 from external impacts and scratches.

In addition, a main support (not shown), which is molded with synthetic resin or SUS steel in a form of a rectangular frame is coupled to an upper side of the sub optical sheet 124.

The liquid crystal panel 131 is stacked on the main support. The liquid crystal panel 131 includes a thin film transistor (TFT) array substrate and a color filter substrate having red (R), green (G) and blue color filters, the two substrates facing each other and being bonded to maintain a uniform cell-gap, and a liquid crystal layer interposed between the two substrates. Also, an upper polarizer 131a and a lower polarizer 131b are disposed at upper and lower sides of the liquid crystal panel 131, respectively.

An upper cover 140 houses four edge areas of the liquid crystal panel 131 and also is assembled/coupled to the main support or lower cover 110.

Figure 3B:
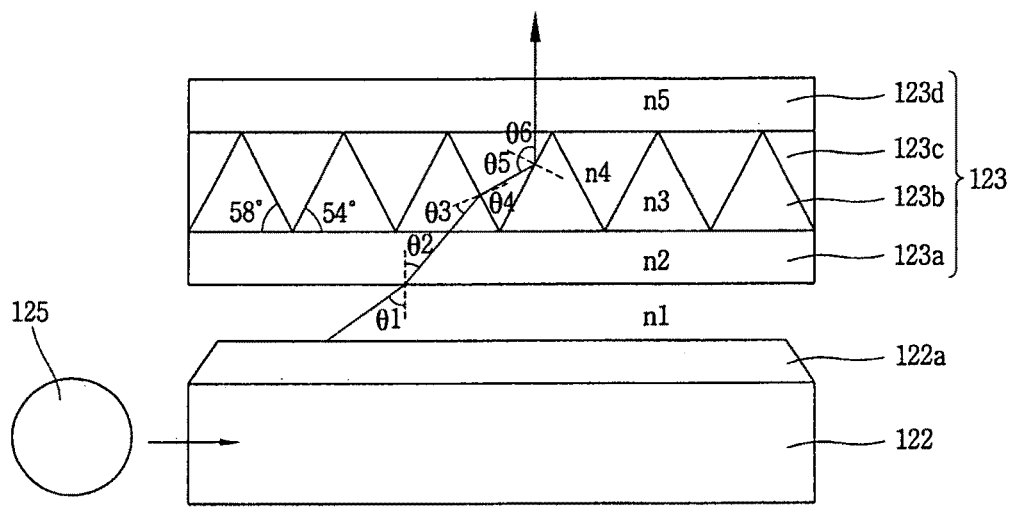

FIG. 3b is a view showing how to concentrate light by a birefringence optical sheet of FIG. 3a. As shown in FIG. 3b, it is assumed that the birefringence optical sheet 123 of the embodiments of the invention includes the first prism mountains 123b having a refractive index n3 of 1.5 and the second prism mountains 123c having a refractive index n4 of 1.51, and interior angles of the first prism mountains 123b are 54° and 58°.

Here, light emitted based upon the prism mountains 122a stacked on the prism light guide plate 122 is emitted via an air layer having a refractive index n1 of 1 to be incident on the lower base film 123a of the birefringence optical sheet 123, thereby forming a certain incident angle θ1. Such light also has an emission angle θ2 having a light path changed according to the incident angle θ1 at the lower base film 123a. Here, since the refractive index n2 of the lower base film 123a is higher than the refractive index n1 of the air, in order to meet the Snell's law, the emission angle θ2 should be smaller than the incident angle θ1.

If the first prism mountains 123b formed on the lower base film 123a is formed of the same material to the lower base film 123a, the refractive indexes n2 and n3 are the same each other, which means the incident angle and the emission angle of the light transmitted through the base film 123a are equal to each other.

Also, light is refracted again at a boundary face between the first prism mountains 123b having the low refractive index n3 and the second prism mountains 123c having the higher refractive index n4 than that of the first prism mountains 123b. For example, if the refractive index n3 of the first prism mountains 123b is 1.5 and the refractive index n4 of the second prism mountains 123c is 1.51, an emission angle θ4 with respect to the boundary face should satisfy the Snell's law. Accordingly, if the incident angle θ3 is 27°, the emission angle θ4 is smaller than the incident angle θ3.

As such, such refracted light is incident on the boundary face between the second prism mountains 123c and the first prism mountains 123b by a certain incident angle θ5. Such incident light is then reflected by a reflection angle θ6 which is the same as the incident angle θ5 of light incident on the boundary face, thereby being concentrated in a direction perpendicular to the liquid crystal panel 131.

Here, if the second prism mountains 123c is formed of the same material to the upper base film 123d stacked on the second prism mountains 123c, the refractive index n5 of the upper base film 123d is the same as the refractive index n4 of the second prism mountains 123c. Accordingly, the incident angel can be the same as the emission angle. Therefore, light having a certain size of refraction angle θ6 is reflected on the boundary face between the first prism mountains 123b and the second prism mountains 123c, so as to be concentrated in the direction perpendicular to the liquid crystal panel 131.

In the LCD device having the aforesaid principle to concentrate light in accordance with the preferred embodiments of the invention, such principle will now be described in more detail with reference to FIG. 3c.

Figure 3C:
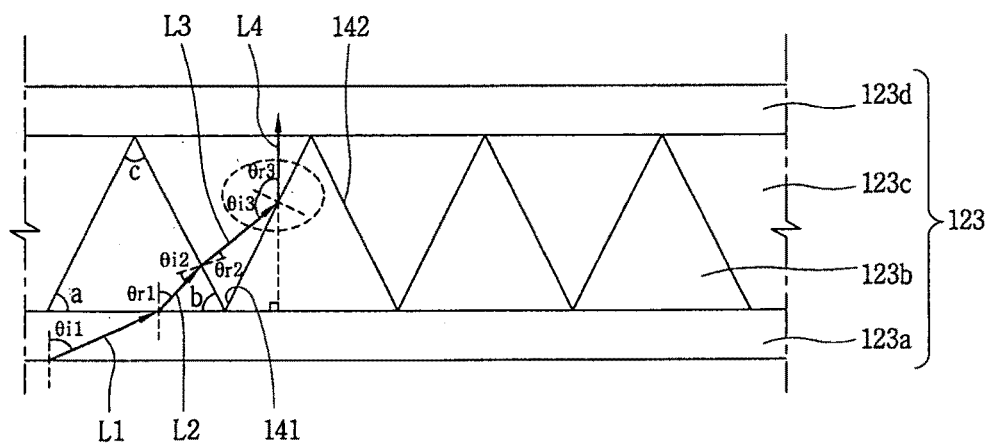
FIG. 3c is a view showing in detail how to concentrate light by the birefringence optical sheet of FIG. 3b.

As shown in FIG. 3c, the birefringence optical sheet 123 is configured such that the first refractive index of the first prism mountains 123b is lower than the second refractive index of the second prism mountains 123c. Accordingly, emission light of the prism light guide plate 122 is refracted more than three times, thus to be provided toward the liquid crystal display 131. Each mountain of the first prism mountains 123b includes a first tilt angle a, a second tilt angle b, a vertical angle c determined by the first and second tilt angle a and b, a first inclined face 141 extending from the first tilt angle a, and a second inclined face 142 extending from the second tilt angle b. The first and second tilt angle a and b are formed in the range of 60° to 89°, and also formed to be symmetrical or asymmetrical. Under the assumption that the first prism mountains 123b has a first refractive index of 1.48, the second prism mountains 123c has a second refractive index of 1.61, the first tilt angle a is 69° and the second tilt angle b is 67°, a light path will be described as follows.

A first light L1 having a first incident angle θi1 from the prism light guide plate 122 is refracted to a second light L2 having a first refractive angle θr1, which is smaller than the first incident angle θi1. The second light L2 incident with a second incident angle θi2 is refracted to a third light L3 having a second refractive angle θr2, which is smaller than the second incident angle θi2, at the second boundary face 142, namely, at the boundary face between the first and second prism mountains 123b and 123c. The third light L3 incident with a third incident angle θi3, is refracted to a fourth light L4 having a third reflective angle θr3 at the first inclined face 141, namely, at the boundary surface between the second and first prism mountains 123c and 123b. The fourth light L4 thusly proceeds in a perpendicular direction at the lower side of the liquid crystal display 131.

The first incident angle θi1 emitted from the prism light guide plate 122 becomes a peak angle of 72° based upon an extension line perpendicularly drawn from the lower side of the first prism mountains 123b. The first refractive angle θr1 is 40° based upon the perpendicular extension line according to the Snell's law. The second incident angle θi2 is 27° based upon a normal of the second inclined face 142. The second refractive angle θr2 is 24° based upon the normal of the second inclined face 142. The third incident angle θi3 is 68° based upon a normal of the first inclined face 141. The third reflective angle θr3 is 68° based upon the normal of the first inclined face 141. The fourth light L4 is perpendicularly refracted by a total reflection.

The first and second tilt angles a and b of the first prim mountain 123b can adjust a radiation angle of the fourth light L4 radiated toward the liquid crystal panel 131 according to the inclined angle of the first light L1. The Snell's law is n2/n1=sin θ2/sinθ1, where n1 denotes the first refractive index of the first prism mountains 123b, and n2 denotes the second refractive index of the second prism mountains 123c. It can be seen according to the Snell's law that the dispersion of light can be lowered when light proceeds from a medium having a low refractive index to a medium having a high refractive index, so as to be concentrated. In order to overcome the limitation of the refraction according to the related art, the LCD device of the embodiments of the invention can concentrate emission light through the prism light guide plate 122 by using the principle of the total reflection, as shown in FIG. 3c. In order to induce perpendicular light by the total reflection, most of light emitted via the prism light guide plate 122 are used, so as to obtain high concentration efficiency.

Figure 4:
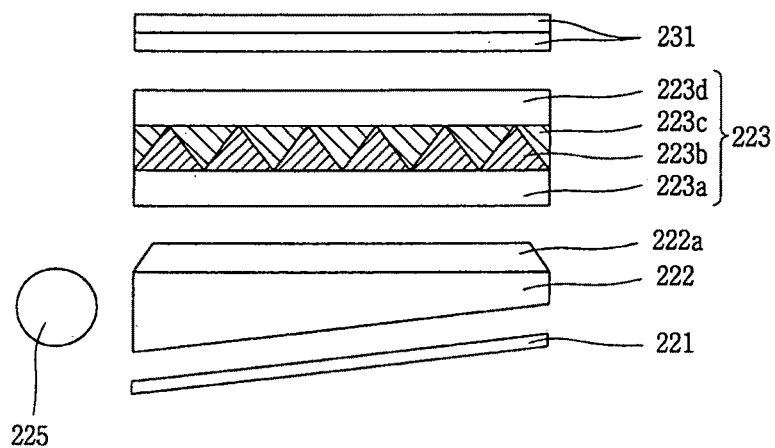
FIG. 4 is a cross-sectional view of a liquid crystal display device, which shows a liquid crystal display device having a wedge type light guide plate according to an embodiment of the invention.

FIG. 4 is a view of a LCD device according to an embodiment of the invention, which shows a LCD device having a wedge type prism light guide plate. As shown in FIG. 4, a LCD device according to an embodiment of the invention may include a liquid crystal panel 231 for implementing an image according to an external signal, a backlight unit 221, 222, 223 and 225 arranged below the liquid crystal panel 231 so as to emit light, and a birefringence optical sheet 223 disposed between the liquid crystal panel 231 and the backlight unit and provided with first prism mountains 223b formed on a wedge type prism light guide plate 222 to have patterns facing the liquid crystal panel and second prism mountains 223c each formed between the first prism mountains 223b, namely, along a ravine of the first prism mountains 223b, and having a refractive index higher than that of the first prism mountains 223b Here, unlike the LCD device having the plate type prism light guide plate 122 as shown in FIG. 3, the LCD device having the wedge type prism light guide plate 222 as shown in FIG. 4 includes a lamp housing (not shown) disposed at one side at a lower side of the liquid crystal panel 231 to house a lamp unit, namely, the lamp 225. Here, the lamp housing may be configured by extending a reflective plate 221. Also, the wedge type prism light guide plate 222 is characteristically configured to have different thicknesses at one side surface facing the lamp 225 arranged in a major axial direction and at another side surface thereof.

Here, the wedge type prism light guide plate 222, similar to the plate type prism light guide plate 122, has prism mountains 222a stacked thereon. The prism mountains 222a is configured to be perpendicular to the extending direction of the lamp 225 arranged in the major axial direction, namely, in a light ongoing direction.

Accordingly, light emitted from the lamp 225 disposed at one side of the wedge type prism light guide plate 222 is induced into the wedge type prism light guide plate 222 to be reflected on the reflective plate 221. Such reflected light is then emitted via the prism mountains 222a stacked on the wedge type prism light guide plate 222 in a direction slant by approximately 76° with respect to the wedge type prism light guide plate 222. Here, the light emitted slant by 76° via the prism light guide plate 222 is emitted in the same direction as in the related art based on the upper side surface of the wedge type prism light guide plate 222.

The birefringence optical sheet 223 disposed at the upper side of the wedge type prism light guide plate 222 is the same to that in the previous embodiment. In other words, the birefringence optical sheet 223 includes first prism mountains 223b formed on a base film 223a configuring a base in a forward direction, namely, a direction orthogonal to the extending direction of the prism mountains 222a of the wedge type prism light guide plate 222 and having a low refractive index, second prism mountains 223c formed by filling a UV curable resin or the like in each ravine of the first prism mountains 223b, and a base film 223d stacked on the second prism mountains 223c. Accordingly, the birefringence optical sheet 223 is configured to have plane upper and lower surfaces.

Light emitted via the wedge type light guide plate 222 by approximately 76° with respect to the upper side surface of the wedge type light guide plate 222 is transmitted via the birefringence optical sheet 223 stacked on the wedge type light guide plate 222, namely, sequentially via the lower base film 223a, the first prism mountains 223b, the second prism mountains 223c and the upper base film 223d, so as to be refracted. Accordingly, such refracted light is emitted in a direction perpendicular to the bottom surface.

The light emitted via the birefringence optical sheet 223 in the direction perpendicular to the bottom surface is thusly uniformly dispersed via a sub optical sheet, such as diff-user sheets (not shown), stacked on the birefringence optical sheet 223, thereby being applied to the liquid crystal panel 231.

With this configuration, even if an external impact is applied to the LCD device and accordingly the prism mountains 222a of the wedge type light guide plate 222 formed of a rigid material occurs a friction with the flat lower surface of the birefringence optical sheet 223 formed of a ductile material, stacked on the prism mountains 222a, the split or collapse of the prism mountains 222a of the wedge type light guide plate 222 can be prevented.

Excluding the aforesaid configuration, the characteristics of the reflective plate 221 and the wedge type light guide plate 222 and detailed description related to the liquid crystal panel 231 will be understood by the previous description thereof.

Figure 5A:
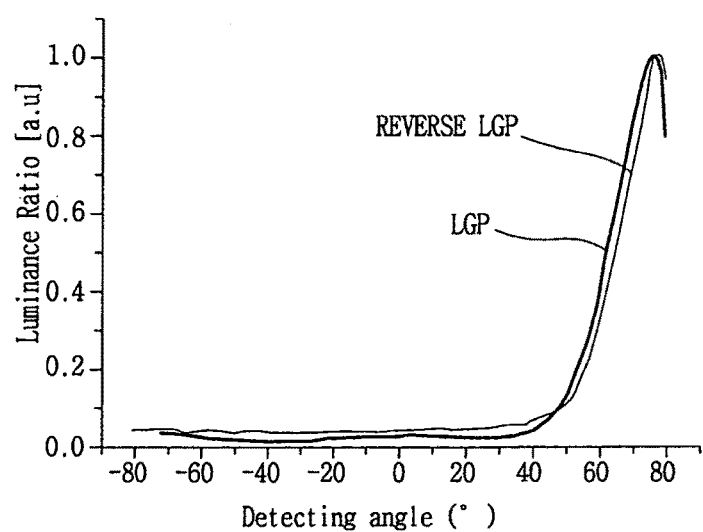
FIG. 5a is a plot chart showing the emission distribution of light transmitted through a prism light guide plate.
Figure 5B:
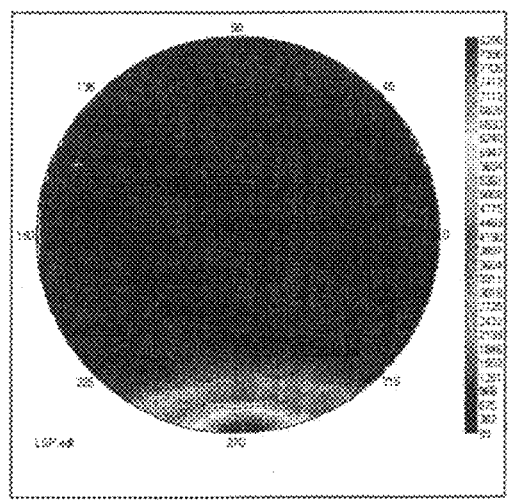
FIG. 5b is a contour chart showing the emission distribution of light transmitted through a prism light guide plate.
Figure 5C:
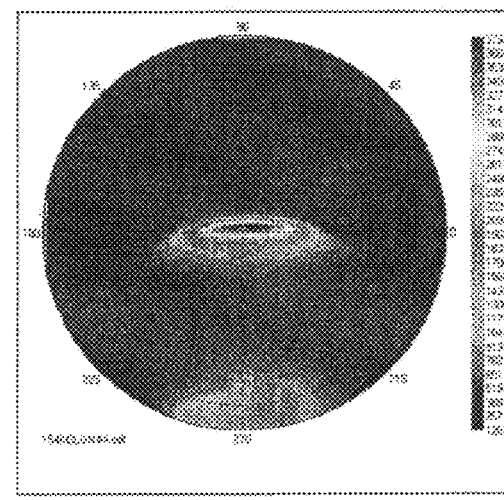
FIG. 5c is a contour chart showing the emission distribution of light transmitted through a birefringence optical sheet.

FIG. 5a is a plot chart showing the emission distribution of light transmitted through a prism light guide plate, FIG. 5b is a contour chart showing the emission distribution of light transmitted through a prism light guide plate, and FIG. 5c is a contour chart showing the emission distribution of light transmitted through a birefringence optical sheet.

As shown in FIGS. 5a and 5b, it can be seen, in the LCD devices respectively having the plate type prism light guide plate and the wedge type prism light guide plate, that most of light having transmitted through the prism light guide plate having prism mountains facing upwardly has a main emission peak intensity slant by approximately 76° with respect to the upper side surface of the light guide plate. It can thusly been noticed, as shown in the related art, that most of light is emitted in the same direction as compared to a prism light guide plate having prism mountains facing downwardly.

The light emitted with being slant by approximately 76° after being transmitted through the prism light guide plate 122 and 222 then proceeds via the birefringence optical sheet 123 and 223 stacked on the prism light guide plate 122 and 222, as shown in FIG. 5c, so as to be provided to the liquid crystal panel 131 and 231 in the direction perpendicular to the bottom surface.

As such, the light having transmitted through the birefringence optical sheet 123 and 223 is diffused by the diffuser sheet or the like stacked on the birefringence optical sheet 123 and 223, thus to be uniformly provided to the liquid crystal panel 131 and 231.

Figure 6A:
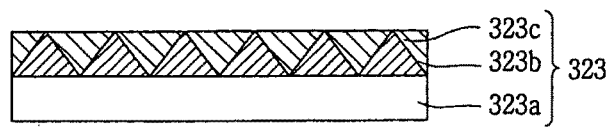
FIGS. 6a through 10b are views showing different variations of a birefringence optical sheet in accordance with embodiments of the invention.
Figure 6B:
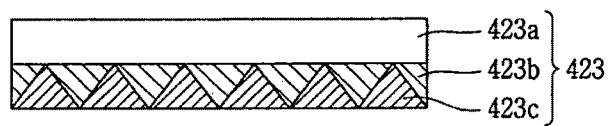

FIGS. 6a and 6b are views showing various variations of a birefringence optical sheet in accordance with the embodiments of the invention. These variations can be much advantageous in terms of decrease in cost as compared to the previous embodiments of the invention.

As shown in FIG. 6a, first prism mountains 323b having a low refractive index are formed on a base film 323a made of PET or PC facing a prism mountain of a prism light guide plate, and each of second prism mountains 323c having a refractive index higher than that of the first prism mountains 323b are formed between two of the first prism mountains 323b. Here, the upper surface of the second prism mountains 323c exposed to the exterior is formed to be flat.

On the other hand, as shown in FIG. 6b, second prism mountains 423b having a high refractive index are first formed on a base film 423a, and each of first prism mountains 423c having a refractive index lower than that of the second prism mountains 423b are formed between two of the second prism mountains 423b. Here, the first prism mountains 423b having the low refractive index exposed to the exterior configures a flat surface. Such flat surface can face a prism mountain of a prism light guide plate. As such, even if the flat surface of the first prism mountains 423c faces the prism mountain of the prism light guide plate, since the prism mountain of the prism light guide plate is formed of a rigid material as compared to the first prism mountains 423c formed of a ductile material, even when an external impact is applied, a split or collapse of patterns of the prism mountain cannot be caused due to the friction between two components, namely, between the prism light guide plate and a birefringence optical sheet.

Figure 7A:
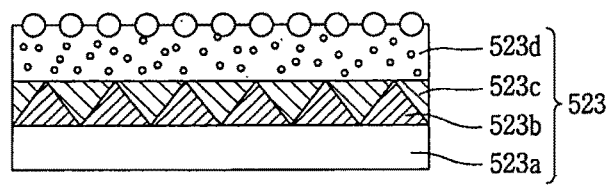
Figure 7B:
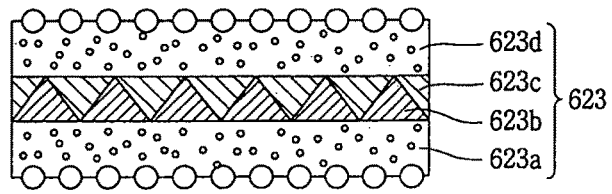

FIGS. 7a and 7b show configurations enabling a cost reduction in view of an entire structure of a LCD device as compared to those shown in FIGS. 6a and 6b. In other words, in the configuration of FIG. 7a, as similar to that in FIG. 6a, first prism mountains 523b having a low refractive index are formed on a base film 523a made of PET or PC facing a prism mountain of a prism light guide plate, and each of second prism mountains 523c having a refractive index higher than that of the first prism mountains 523b is formed between two of the first prism mountains 523b. Another base film is stacked on the second prism mountains 523c. The base film is configured as a diffuser base film 523d having diffuser patterns or diffuser particles at its interior or exterior. Here, the diffuser pattern or diffuser particle may be formed of at least one material of PMMA, silica and PC.

In this configuration, it is possible to remove the related art diffuser sheets stacked on the birefringence optical sheet 523.

In addition, in the configuration of FIG. 7b, first prism mountains 623b having a low refractive index are formed on a first diffuser base film 623a facing a prism mountain of a prism light guide plate. Each of second prism mountains 623c having a refractive index higher than that of the first prism mountains 623b is formed between two of the first prism mountains 623b, and then a second diff-user base film 623d is then stacked on the second prism mountains 623c.

Here, the first and second diffuser base films 623a and 623d also contain diffuser patterns or diffuser particles at their interior or exterior. The diffuser pattern or diffuser particle may also be formed of at least one material of PMMA, silica and PC.

Figure 8:
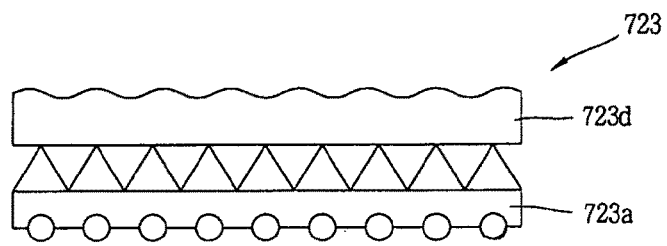

As shown in FIG. 8, the embodiments of the invention can be applied such that one of a lower base film 723a and an upper base film 723d of a birefringence optical sheet 723 has diffuser patterns at its surface or diffuser particles at its interior or exterior, and the other has a prism pattern including micro lens at its surface.

Here, micro lens made of ultraviolet curable resin.

Figure 9:
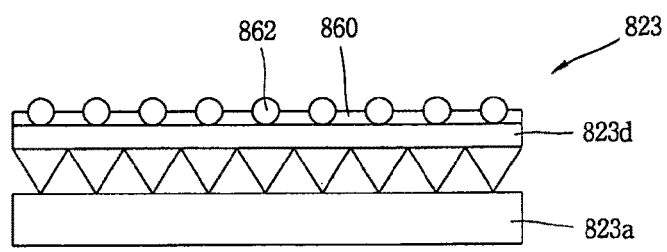

As shown in FIG. 9, the embodiments of the invention can be applied such that at least one of a lower base film 823a and an upper base film 823d of a birefringence optical sheet 823 is deposited with a binder 860 containing beads 862. In this variation, the binder 860 serves to fix the beads 862 to the lower and upper base films 823a and 823d. The beads 862 serves to shield emission light of the birefringence optical sheet 823 from being affected by particles, and to implement seemingly smooth emission light.

Figure 10A:
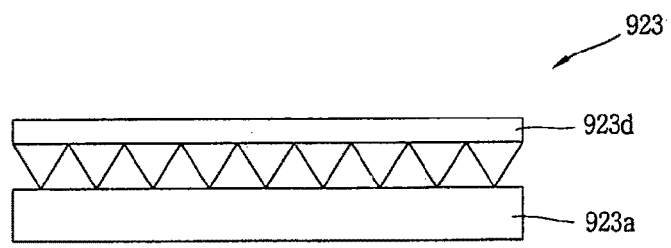
Figure 10B:
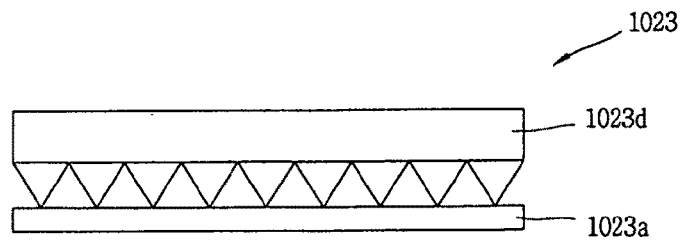

FIGS. 10a and 10b show another variation of the embodiments of the invention in that the thickness of a lower base film 923a and 1023a is asymmetric to that of an upper base film 923d and 1023d, so as to reduce the thickness of a birefringence optical sheet 923 and 1023. As shown in FIG. 9a, the upper base film 923d of the birefringence optical sheet 923 is configured to be thinner than the lower baser film 923a. This configuration is intended to prevent a flexion in a shape of cap that both end portions of the birefringence optical sheet 923 is rolled downwardly, which may be caused when a thermal expansion rate of the upper base film 923d is greater than that of the lower base film 923a in case where the lower and upper base film 923a and 923d have the same thickness.

As shown in FIG. 10b, the upper base film 1023d of the birefringence optical sheet 1023 is configured to be thicker than the lower baser film 1023a. This configuration is intended to prevent a flexion in a shape of cup that both end portions of the birefringence optical sheet 1023 is rolled upwardly, which may be caused when a thermal expansion rate of the upper base film 1023d is smaller than that of the lower base film 1023a in case where the lower and upper base film 1023a and 1023d have the same thickness.

In the LCD device according to preferred embodiments of the invention is capable of being implemented in various variations as aforementioned, when an external vibration or impact is applied, a split and collapse of prism patterns, which may be caused by a friction between a prism light guide plate or prism sheet and a component disposed at its upper or lower side, can be prevented. Accordingly, an occurrence of a white spot phenomenon caused by such split and collapse can be minimized. Hence, a light with uniform brightness can be applied to a liquid crystal panel, thus to improve image quality.

The LCD device according to preferred embodiments of the invention can be provided with a birefringence optical sheet having second prism mountains filled in ravine areas of first prism mountains, which alternately have mountains and ravines, so as to have a refractive index higher than that of the first prism mountains, whereby emission light via a prism light guide plate can perpendicularly be collected, thus to enhance brightness.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a liquid crystal panel configured to represent an image;
a lamp disposed below the liquid crystal panel to provide light to the liquid crystal panel;
a light guide plate having the lamp disposed at least at one side thereof; and
a birefringence optical sheet disposed between the liquid crystal panel and the light guide plate, and the birefringence optical sheet including a first base film, a second base film, a first prism pattern with a first refractive index, and a second prism pattern with a second refractive index, the first prism pattern being facing the liquid crystal panel and the second prism pattern being facing the light guide plate, the second refractive index of the second prism pattern being higher than the first refractive index of the first prism pattern,
wherein the lower surface of the first prism pattern and the second prism pattern are respectively formed on the first base film and the second base film and the upper portions of the first prism pattern and the second prism pattern are respectively contacted with the second base film and the first base film,
wherein the first base film is apart from the second base film, and the first and the second prism patterns are disposed between the first base film and the second base film,
wherein a thickness of the first base film of the birefringence optical sheet is smaller than that of the second base film when a thermal expansion ratio of the first base film is greater than that of the second base film, and the thickness of the second base film of the birefringence optical sheet is smaller than that of the first base film when the thermal expansion ratio of the second base film is greater than that of the first base film.

2. The device of claim 1, wherein the light guide plate has prism pattern formed on an upper surface thereof in a direction facing the liquid crystal panel.

3. The device of claim 2, wherein the prism pattern of the light guide plate is at least one of prism mountain, lenticular form and pyramid form.

4. The device of claim 1, wherein a prism pattern of the light guide plate is formed to be at least one of intaglio or relievo.

5. The device of claim 1, wherein the first prism pattern of the birefringence optical sheet is at least one of prism mountain, lenticular form, pyramid form and polygonal form.

6. The device of claim 1, wherein the first and second base films are made of at least one of polyethylene (PET) or polycarbonate (PC).

7. The device of claim 1, wherein the at least one base film of the first and second base films is a diffuser base film.

8. The device of claim 7, wherein the diffuser base film comprises diffuser patterns at its surface or diffuser particles at its interior or exterior.

9. The device of claim 7, wherein the diffuser base film has a prism pattern having micro lens at its surface.

10. The device of any one of claims 7-9, wherein the diffuser base film on one side of the birefringence optical sheet has diffuser patterns or diffuser particles at its interior or exterior, and/or the diffuser base film on the other side of the birefringence optical sheet has a prism pattern including micro lens at its surface.

11. The device of claim 9, wherein the micro lens is made of ultraviolet curable resin.

12. The device of claim 8, wherein the diffuser patterns or diffuser particles are formed of at least one material of polymethylmethacrylate (PMMA), silica and polycarbonate.

13. The device of claim 1, wherein the surface of the at least one base film is deposited with a binder containing beads.

14. The device of claim 13, wherein the beads and the binder are made of a transparent material.

15. The device of claim 1, wherein the base film and the first and second prism patterns are formed of a transparent film.

16. The device of claim 1, wherein the difference between the first refractive index of the first prism pattern and the second refractive index of the second prism pattern is 0.1 or more.

17. The device of claim 16, wherein the difference between the first refractive index of the first prism pattern and the second refractive index of the second prism pattern is in the range of 0.1 to 0.2.

18. The device of claim 1, wherein the first refractive index of the first prism pattern is in the range of 1.3 to 1.9, and the second refractive index of the second prism pattern is in the range of 1.4 to 2.0.

19. The device of claim 18, wherein the first refractive index of the first prism pattern is in the range of 1.3 to 1.49, and the second refractive index of the second prism pattern is in the range of 1.5 to 1.7.

20. The device of claim 1, wherein each mountain of the first prism pattern includes first and second tilt angles, and a vertical angle determined by the first and second tilt angles, and the first and second tilt angles are symmetrical or asymmetrical to each other.

* * * * *